(12) United States Patent
Hwang et al.

(10) Patent No.: US 9,069,109 B2
(45) Date of Patent: Jun. 30, 2015

(54) PLANAR 3-DOF STAGE

(75) Inventors: Dong Hyun Hwang, Busan (KR); Moon Gu Lee, Gyeonggi-do (KR); Yong Hwan Yoo, Gyeonggi-do (KR); Jae Hwa Jeong, Gyeonggi-do (KR)

(73) Assignee: Ajou University Industry-Academic Cooperation Foundation (KR)

( * ) Notice: Subject to any disclaimer, the term of this patent is extended or adjusted under 35 U.S.C. 154(b) by 416 days.

(21) Appl. No.: 13/320,486

(22) PCT Filed: Mar. 30, 2010

(86) PCT No.: PCT/KR2010/001951
§ 371 (c)(1),
(2), (4) Date: Nov. 14, 2011

(87) PCT Pub. No.: WO2011/093553
PCT Pub. Date: Aug. 4, 2011

(65) Prior Publication Data
US 2012/0279344 A1    Nov. 8, 2012

(30) Foreign Application Priority Data
Jan. 29, 2010   (KR) .................. 10-2010-0008718

(51) Int. Cl.
*G02B 7/00*    (2006.01)
*H02N 2/02*    (2006.01)
(Continued)

(52) U.S. Cl.
CPC .......... *G02B 7/005* (2013.01); *Y10T 74/20348* (2013.01); *G02B 21/26* (2013.01); *H02N 2/028* (2013.01); *H02N 2/043* (2013.01); *H02N 2/046* (2013.01)

(58) Field of Classification Search
USPC ............................. 74/490.03, 490.08, 490.13; 310/311–371; 850/1–3, 18
See application file for complete search history.

(56) References Cited

U.S. PATENT DOCUMENTS 4,559,717 A * 12/1985 Scire et al. ...................... 33/568
4,644,213 A *  2/1987 Shibuya ......................... 310/328
(Continued)

FOREIGN PATENT DOCUMENTS

JP    01-246036    10/1989
JP    05-004138     1/1993
(Continued)

OTHER PUBLICATIONS

International Search Report prepared by the Korean Intellectual Property Office on Feb. 23, 2011, for International Application No. PCT/KR2010/001951.

(Continued)

*Primary Examiner* — William Kelleher
*Assistant Examiner* — Zakaria Elahmadi
(74) *Attorney, Agent, or Firm* — Sheridan Ross P.C.

(57) ABSTRACT

The present invention relates to a planar 3-DOF (degree of freedom) stage, which includes: a transitional manipulator section having parallel 2-DOF; a rotation manipulator section having rotation 1-DOF so as to carry out motion independently from the transitional manipulator section; and a stage base mounted with the transitional manipulator section and the rotation manipulator section and having a fixing section inside and a driving section outside. According to the planar 3-DOF stage, transitional motion and rotational motion are independently carried out so that it is possible to reduce motion errors and simplify control and design.

9 Claims, 7 Drawing Sheets (51) Int. Cl.
*H02N 2/04* (2006.01)
*G02B 21/26* (2006.01)

(56) References Cited

U.S. PATENT DOCUMENTS

| | | | | |
|---|---|---|---|---|
| 5,153,494 | A * | 10/1992 | Hollis, Jr. | 318/640 |
| 5,323,712 | A * | 6/1994 | Kikuiri | 108/20 |
| 5,858,587 | A * | 1/1999 | Yamane et al. | 430/22 |
| 6,346,710 | B1 * | 2/2002 | Ue | 250/442.11 |
| 6,622,586 | B2 * | 9/2003 | Scheidegger et al. | 74/490.08 |
| 6,717,333 | B2 * | 4/2004 | Hermle et al. | 310/328 |
| 6,806,991 | B1 * | 10/2004 | Sarkar et al. | 359/290 |
| 6,920,696 | B2 * | 7/2005 | Sawada et al. | 33/1 M |
| 7,024,925 | B2 * | 4/2006 | Gweon et al. | 73/105 |
| 7,240,434 | B2 * | 7/2007 | Lee et al. | 33/1 M |
| 7,257,902 | B2 * | 8/2007 | Gao et al. | 33/1 M |
| 7,348,709 | B2 * | 3/2008 | Xu | 310/328 |
| 7,557,470 | B2 * | 7/2009 | Culpepper et al. | 310/15 |
| 8,312,561 | B2 * | 11/2012 | Rangelow et al. | 850/18 |
| 2001/0050801 | A1 * | 12/2001 | Behin et al. | 359/298 |
| 2004/0163450 | A1 * | 8/2004 | Gweon et al. | 73/105 |
| 2005/0198844 | A1 * | 9/2005 | Lee et al. | 33/1 M |
| 2012/0119620 | A1 * | 5/2012 | Xu et al. | 310/328 |

FOREIGN PATENT DOCUMENTS

| | | |
|---|---|---|
| JP | 6004209 | 1/1994 |
| JP | 09-230251 | 9/1997 |
| KR | 10-0223624 | 10/1999 |
| KR | 10-0497729 | 6/2005 |

OTHER PUBLICATIONS

International Search Report for International Application No. PCT/KR2010/001951, mailed Feb. 23, 2011, 4 pages.

* cited by examiner

PLANAR 3-DOF STAGE

TECHNICAL FIELD

The present invention relates to an ultra-precision stage, and more particularly, to a planar 3-degree of freedom (DOF) stage which includes a rotational mechanism carrying out motion independent of a translational mechanism.

BACKGROUND ART

Generally, an ultra-precision stage is constituted by a piezoelectric actuator and flexural hinges, and is used in a wide range of applications, such as scanning probe microscopes, photographic printers, micro aligners, precision processing machines, micro assemblers, nano instruments, spectrometers, flat panel displays, semiconductor inspectors, and the like.

Particularly, various types of positioning devices constituted by a piezoelectric actuator and flexural hinges have been developed due to merits thereof, such as a high degree of transfer precision, easy design and easy machining. For example, with the development of robotics, many studies have been conducted with respect to a positioning device configured to carry out translational motion of 2 degrees of freedom and rotational motion of 1 degree of freedom.

It should be noted that the above description is provided for understanding of the background art and is not a description of a well-known technique in the art.

DISCLOSURE

Technical Problem

A conventional stage configured to carry out translational motion of 2 degrees of freedom and rotational motion of 1 degree of freedom has a parallel structure. Accordingly, in the conventional stage, an actuator for translational motion, an actuator for rotational motion, and guide units for guiding such motions are connected to one another, so that unintended motion is likely to occur together with intended motion even when one of the translational motion and the rotational motion is intended, thereby causing motion errors. In order to prevent such motion errors, the stage requires an additional control mechanism, thereby providing a more complicated structure while deteriorating the degree of precision.

Therefore, there is a need to solve such problems of the related art.

The present invention has been conceived to solve such problems of the related art and is directed to providing a planar 3-DOF stage which has a simple structure and may improve the degree of precision.

Technical Solution

In accordance with an aspect of the present invention, a planar 3-DOF stage includes: a translational mechanism carrying out translational motion of 2 degrees of freedom; a rotational mechanism carrying out rotational motion of 1 degree of freedom independent of the translational mechanism; and a stage base equipped with the translational mechanism and the rotational mechanism, and having a stationary section formed on an inner region thereof and an operating section formed on an outer region thereof.

The translational mechanism may include a cymbal mechanism disposed between the stationary section and the operating section such that the cymbal mechanism is connected at one side thereof to the stationary section and at the other side thereof to the operating section, and the rotational mechanism may include a Scott-Russell linkage disposed on the stationary section.

The translational mechanism may include a plurality of cymbal mechanisms bisymmetrically installed on the stage base. Here, each cymbal mechanism is disposed between the stationary section and the operating section such that the cymbal mechanism is connected at one side thereof to the stationary section and at the other side thereof to the operating section The cymbal mechanisms may include a pair of first cymbal units disposed at upper and lower portions of the stage base, and a pair of second cymbal units disposed at right and left sides of the stage base.

The pair of first cymbal units and the pair of second cymbal units may be disposed orthogonal to each other, and when one of the first cymbal units is displaced, the pair of second cymbal units may guide translational motion of the operating section by the pair of first cymbal units.

The cymbal mechanism may include an inner end connected to the stationary section; an exterior end disposed at an opposite side to the interior end and connected to the operating section; a first end disposed between the operating section and the stationary section; a second end disposed at an opposite side to the first end; a first flexural hinge link connecting the first end to the exterior end; a second flexural hinge link connecting the exterior end to the second end; a third flexural hinge link connecting the second end to the interior end; and a fourth flexural hinge link connecting the interior end to the first end, and a first actuator may be interposed between the first end and the second end to change a distance between the first end and the second end.

The Scott-Russell linkage may include a first link connected to the other side of a second actuator connected at one side thereof to the stationary section; a second link connected at one side thereof to the first link and connected at the other side thereof to the stationary section such that the second link is rotated by movement of the first link to rotate the stationary section; and a third link connected at one side thereof to the second link and connected at the other side thereof to the stationary section.

The rotational mechanism may further include a leaf spring disposed outside the Scott-Russell linkage to guide rotation of the stationary section.

The rotational mechanism may include a plurality of leaf springs disposed outside the Scott-Russell linkage to guide rotation of the stationary section and arranged at equal rotational intervals about the center of the stationary section.

The translational mechanism and the rotational mechanism may be coplanar with each other on the stage base.

Advantageous Effects

According to exemplary embodiments, a planar 3-DOF stage allows translational motion and rotational motion to be independently carried out, thereby reducing motion errors while facilitating control and design thereof.

Further, the planar 3-DOF stage according to the exemplary embodiments includes a translational mechanism and a rotational mechanism arranged coplanar with each other, thereby simplifying the structure thereof while improving responsiveness with respect to inertia moment by lowering the center of motion.

BEST MODE

Exemplary embodiments of the present invention will now be described in more detail with reference to the accompanying drawings. It should be noted that the drawings are not to precise scale and may be exaggerated in thickness of lines or size of components for descriptive convenience and clarity only.

Further, terms used herein are defined by taking functions of the present invention into account and can be changed according to the custom or intention of users or operators. Therefore, definition of the terms should be made according to the overall disclosure set forth herein.

Figure 1:
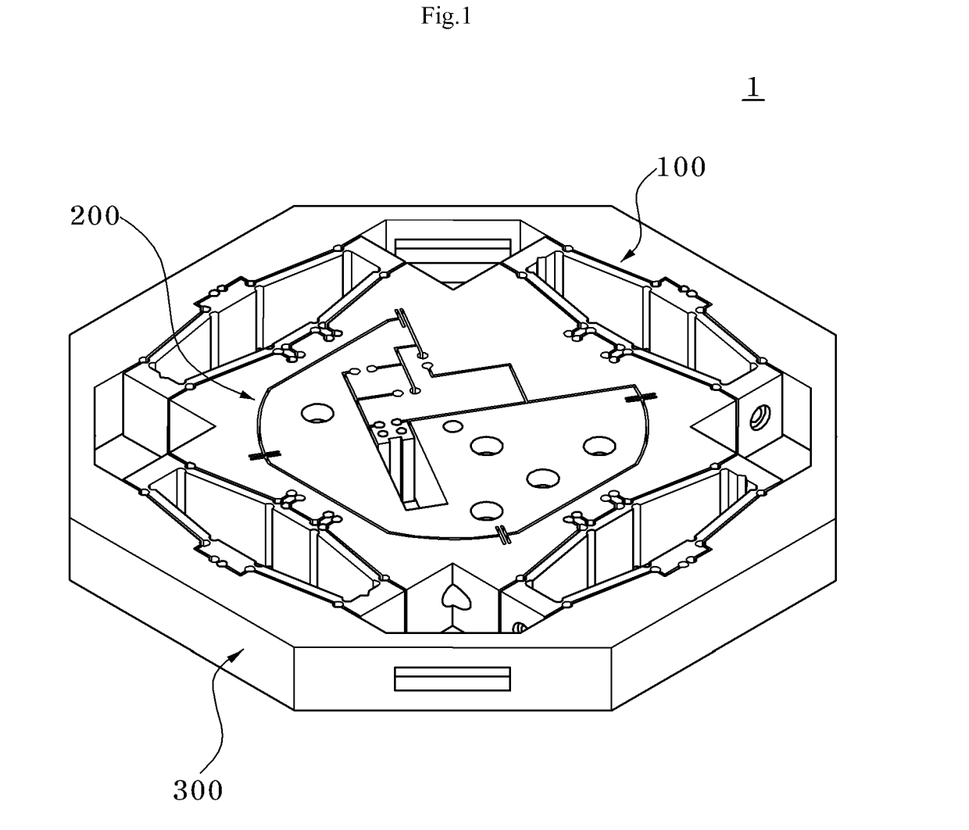
FIG. 1 is a perspective view of a planar 3-DOF stage in accordance with one exemplary embodiment of the present invention.
Figure 2:
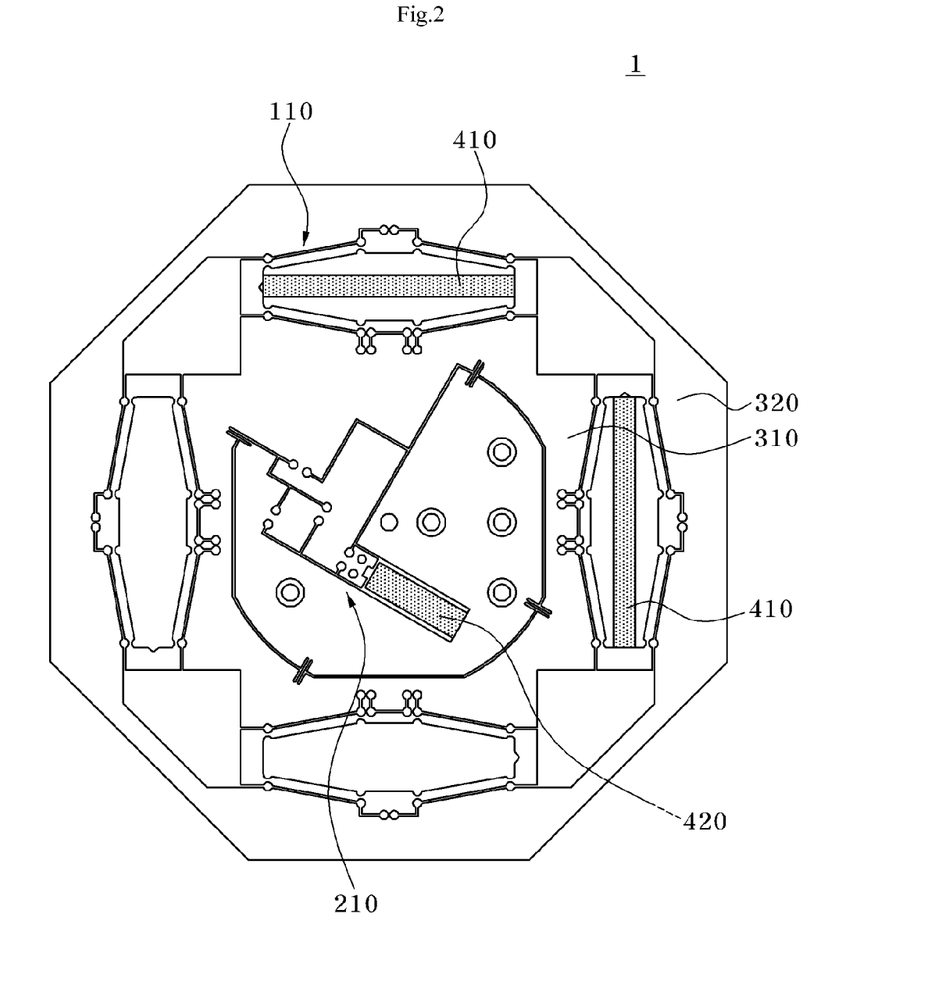
FIG. 2 is a plan view of the planar 3-DOF stage in accordance with the exemplary embodiment of the present invention.
Figure 3:
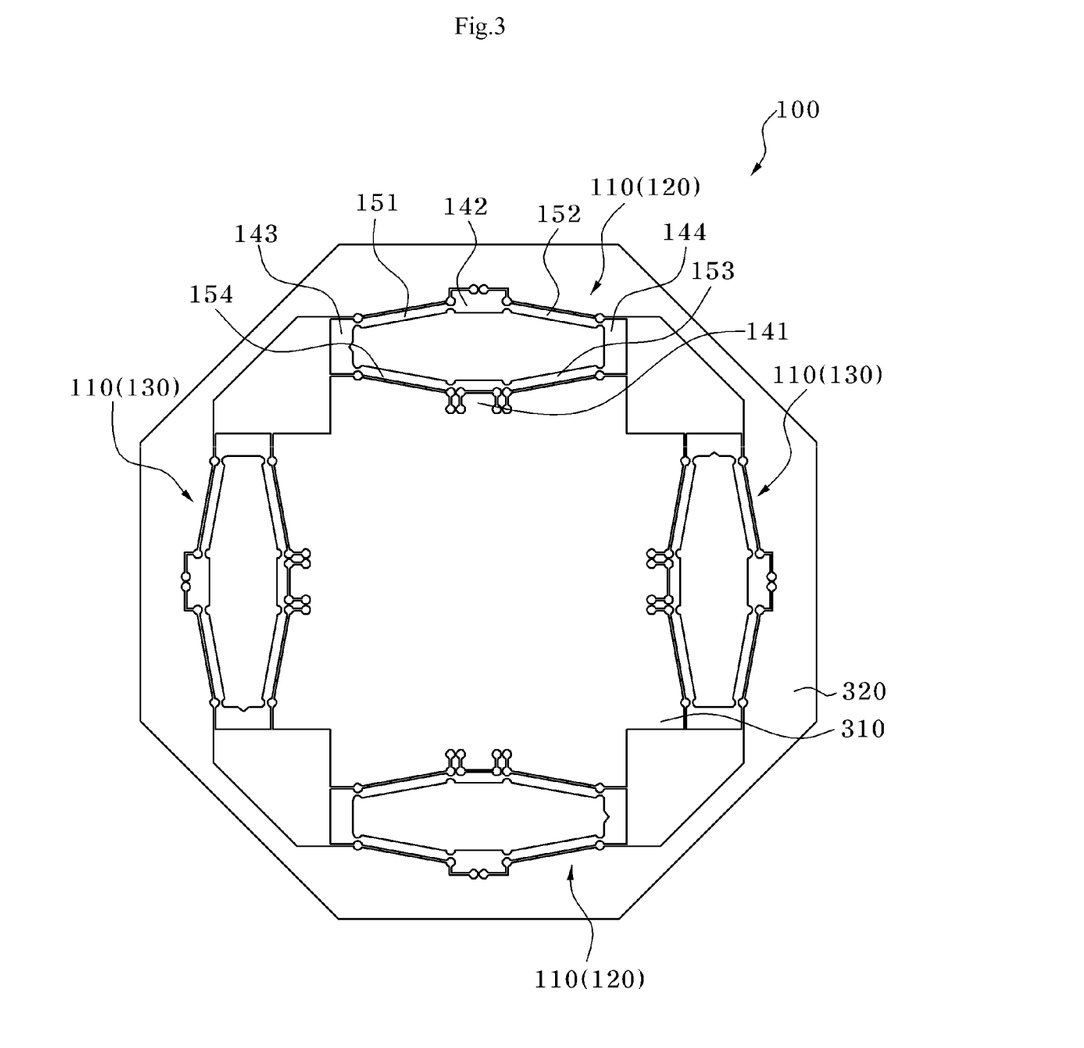
FIG. 3 is a plan view of a translational mechanism of the planar 3-DOF stage in accordance with the exemplary embodiment of the present invention.
Figure 4:
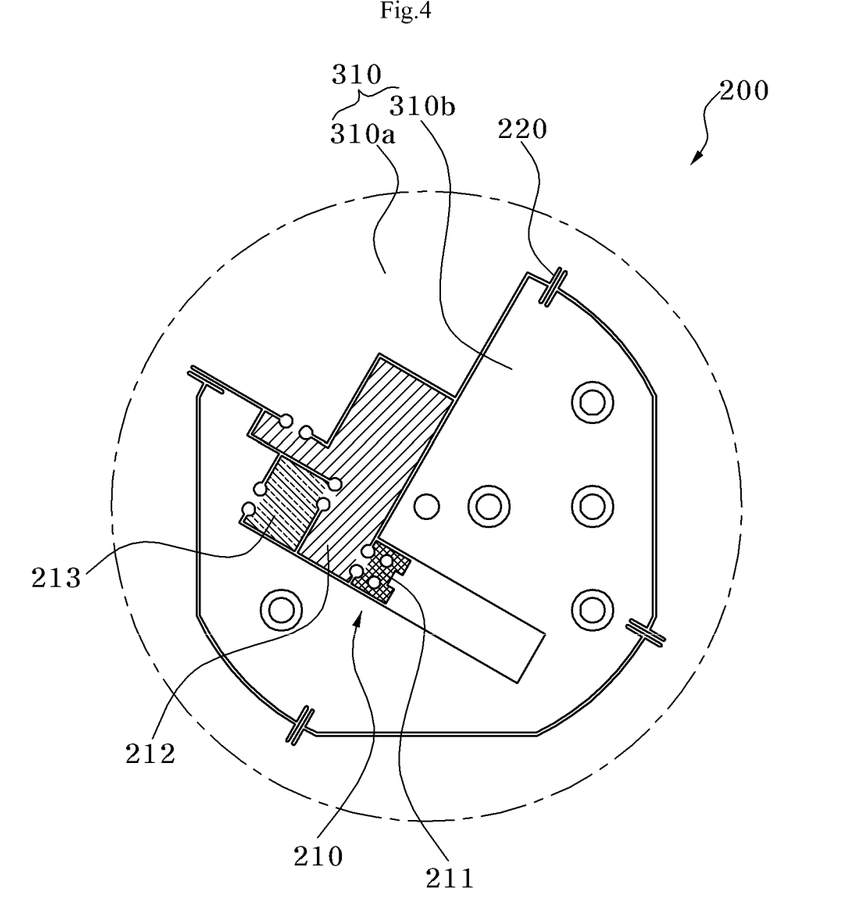
FIG. 4 is a plan view of a rotational mechanism of the planar 3-DOF stage in accordance with the exemplary embodiment of the present invention.
Figure 5:
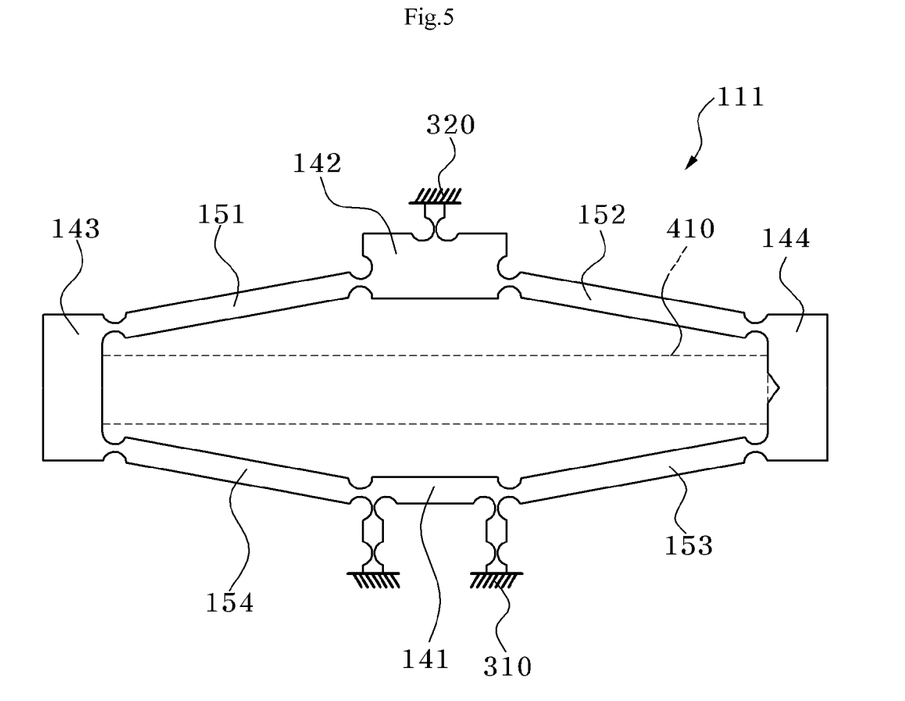
FIG. 5 is a plan view of a cymbal mechanism of the planar 3-DOF stage in accordance with the exemplary embodiment of the present invention.
Figure 6:
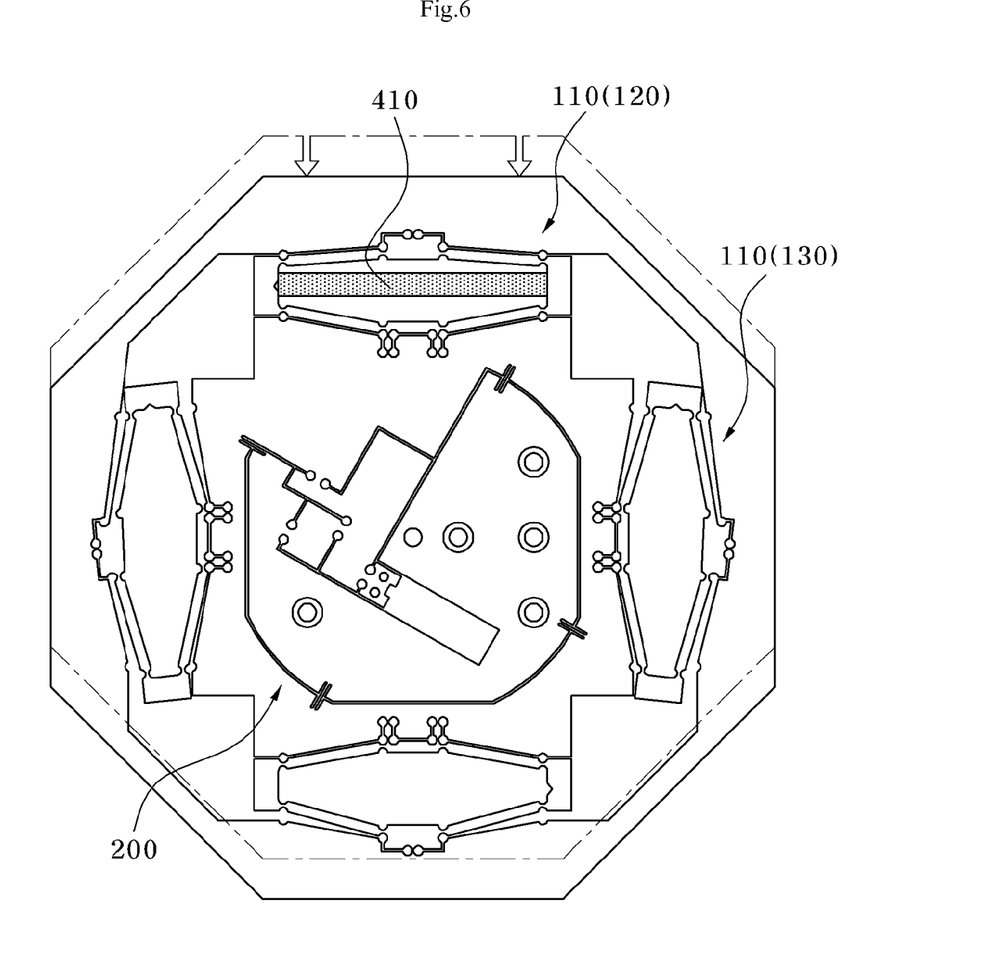
FIG. 6 is a plan view of the planar 3-DOF stage in accordance with the exemplary embodiment of the present invention when carrying out translational motion.
Figure 7:
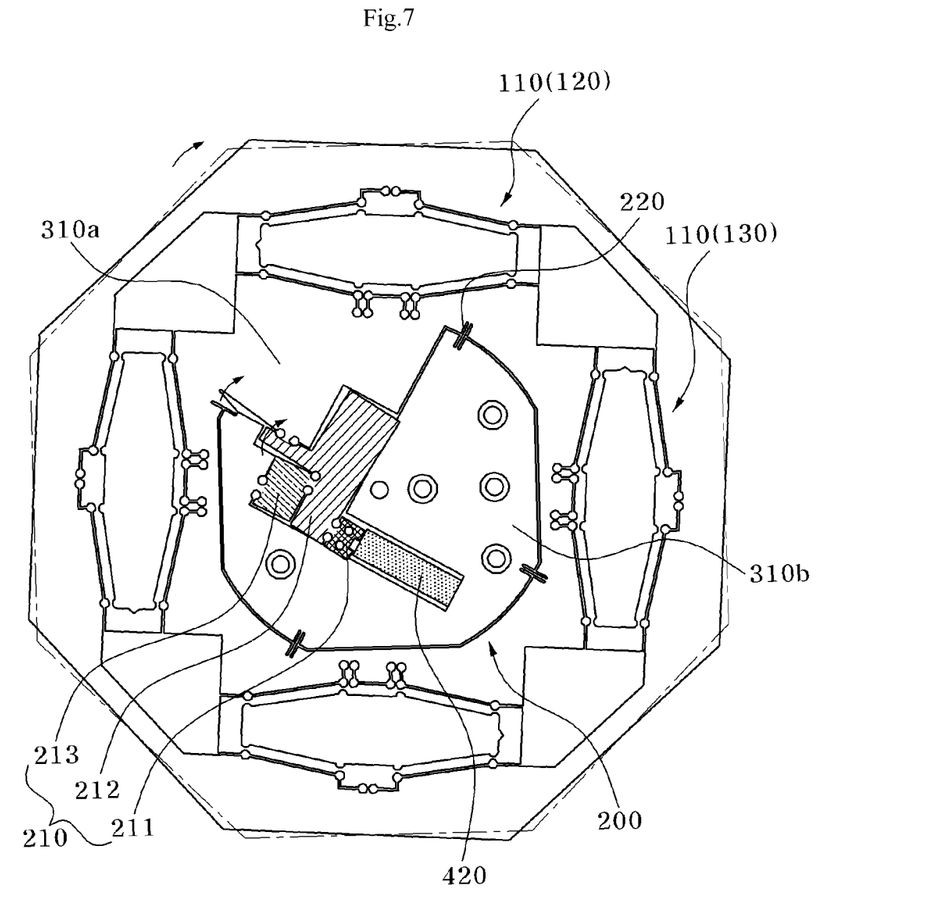
FIG. 7 is a plan view of the planar 3-DOF stage in accordance with the exemplary embodiment of the present invention when carrying out rotational motion.

FIG. 1 is a perspective view of a planar 3-DOF stage in accordance with one exemplary embodiment; FIG. 2 is a plan view of the planar 3-DOF stage in accordance with the exemplary embodiment, FIG. 3 is a plan view of a translational mechanism of the planar 3-DOF stage in accordance with the exemplary embodiment; FIG. 4 is a plan view of a rotational mechanism of the planar 3-DOF stage in accordance with the exemplary embodiment; FIG. 5 is a plan view of a cymbal mechanism of the planar 3-DOF stage in accordance with the exemplary embodiment; FIG. 6 is a plan view of the planar 3-DOF stage in accordance with the exemplary embodiment when carrying out translational motion; and FIG. 7 is a plan view of the planar 3-DOF stage in accordance with the exemplary embodiment when carrying out rotational motion.

Referring to FIGS. 1 to 7, the planar 3-DOF stage 1 according to the embodiment of the invention includes a translational mechanism 100, a rotational mechanism 200, and a stage base 300.

The stage base 300 includes a stationary section 310 and an operating section 320. The rotational mechanism 200 is disposed on the stationary section 310 and the translational mechanism 100 is disposed between the stationary section 310 and the operating section 320.

The stationary section 310 is formed on an inner region of the stage base 300 and the operating section 320 is formed on an outer region of the stage base 300. A cymbal mechanism 110 is interposed between the stationary section 310 and the operating section 320 to divide the stationary section 310 and the operating section 320.

The stationary section 310 is surrounded by the cymbal mechanism 110 and is kept in a stationary state instead of carrying out translational motion during operation of the translational mechanism 100. Further, during operation of the rotational mechanism 200, some region of the stationary section 310 rotates in the clockwise or counterclockwise direction, and the remaining region is kept in a stationary state instead of rotating. Specifically, during operation of the rotational mechanism 200, an exterior portion 310a of the stationary section 310 is rotated by a Scott-Russell linkage 210 described below, whereas an interior portion 310b of the stationary section 310 is secured by a leaf spring 220 described below, instead of rotating.

The operating section 320 is disposed outside the cymbal mechanism 110 and is moved along one axis or along the other axis orthogonal to the one axis during operation of the translational mechanism 100. Further, the operating section 320 is rotated in the clockwise or counterclockwise direction during operation of the rotational mechanism 200.

The translational mechanism 100 carries out translational motion of 2 degrees of freedom. In other words, the translational mechanism 100 carries out translational motions in one axial direction and in another axial direction orthogonal to the one direction. Such a translational mechanism 100 is mechanically separate from the rotational mechanism 200, so that operation of the translational mechanism 100 does not influence operation of the rotational mechanism 200.

Similarly, operation of the rotational mechanism 200 does not influence operation of the translational mechanism 100. As such, since the translational mechanism 100 and the rotational mechanism 200 are independently moved so as not to affect each other, it is possible to prevent motion errors caused by unintended motion.

The translational mechanism 100 includes the cymbal mechanism 110.

The cymbal mechanism 110 is disposed between the stationary section 310 and the operating section 320. The cymbal mechanism 110 is connected at one side thereof to the stationary section 310 via a flexural hinge and at the other side thereof to the operating section 320 via a flexural hinge. Here, since the configuration of the flexural hinge is apparent to a person having ordinary knowledge in the art, a detailed description thereof will be omitted herein.

The planar 3-DOF stage 1 according to the embodiment includes a plurality of cymbal mechanisms 110 bisymmetrically arranged on the stage base 300. Although this embodiment is illustrated as including four cymbal mechanisms 110 symmetrically arranged at upper, lower, right and left sides of the stage base in FIG. 2, the invention is not limited thereto. That is, any number of cymbal mechanisms 110 may be provided so long as the cymbal mechanisms are bisymmetrically arranged on the stage base.

In this embodiment, four cymbal mechanisms are arranged at rotational intervals of 90 degrees about the center of the stage base 300.

The cymbal mechanisms 110 are constituted by a pair of first cymbal units 120 disposed at upper and lower portions of the stage base 300 and a pair of second cymbal units 130 disposed at right and left sides of the stage base.

The pair of first cymbal units 120 is disposed orthogonal to the pair of second cymbal units 130. Accordingly, when one of the first cymbal units 120 is displaced, the pair of second cymbal units 130 disposed horizontal to a moving direction of the operating section 320 by the pair of first cymbal units 120 guides translational motion of the operating section 320 so as to achieve stable movement of the operating section 320 without rattling.

That is, when the operating section 320 is moved downwards by operation of a first cymbal unit 111 disposed at an upper portion of the stage base 300, the pair of second cymbal units 130 disposed at the right and left sides guides the operating section 320 so move downwards without rattling.

Similarly, when one of the second cymbal units 130 is displaced, the pair of first cymbal units 120 disposed horizontal to a moving direction of the operating section 320 by the pair of second cymbal units 130 guides translational motion of the operating section 320 in a lateral direction so as to achieve stable movement of the operating section 320 in the lateral direction without rattling.

As a result, according to the present invention, the cymbal mechanisms 110 may not only increase or decrease the displacement thereof, but also guide the translational motion of the operating section 320.

On the other hand, as described above, during movement of the translational mechanism 100, the rotational mechanism 200 mechanically separated from the translational mechanism 100 does not rotate the operating section 320.

Each of the cymbal units constituting the cymbal mechanisms 110 includes an interior end 141, an exterior end 142, a first end 143, a second end 144, a first flexural hinge link 151, a second flexural hinge link 152, a third flexural hinge link 153, and a fourth flexural hinge link 154.

The interior end 141 is disposed inside the stationary section 310 and connected to the stationary section 310 via a flexural hinge, and the exterior end 142 is disposed at an opposite side to the interior end 141 and is connected to the operating section 320 via a flexural hinge.

Translational motion of the operating section 320 by operation of the cymbal mechanisms 110 occurs when the exterior end 142 is moved by displacement of the cymbal mechanisms, with the interior end 141 secured by the stationary section 310.

The first end 143 is disposed between the stationary section 310 and the operating section 320, and is coupled to one end of a first actuator 410. Here, a piezoelectric actuator may be applied to the first actuator 410. The piezoelectric actuator is operated based on a piezoelectric phenomenon in which application of pressure to both sides of the piezoelectric actuator results in generation of positive and negative charges proportional to the applied pressure. Specifically, when voltage is applied to both sides of the piezoelectric actuator, deformation of the piezoelectric actuator occurs such that the piezoelectric actuator is stretched in one direction and shrunk in another direction perpendicular to the one direction. Based on this phenomenon, the piezoelectric actuator is used as an actuating source for the stage for carrying out ultra precision motion.

The second end 144 is disposed between the stationary section 310 and the operating section 320 and is coupled to the other end of the first actuator 410. The second end 144 is placed at an opposite side to the first end 143.

The first actuator 410 is interposed between the first end 143 and the second end 144. The first actuator 410 may be interposed between the first end 143 and the second end 144 through various coupling ways, such as press-fitting and the like.

The interior end 141, the exterior end 142, the first end 143 and the second end 144 are connected to one another by flexural hinge links. Specifically, a first flexural hinge link 151 connects the first end 143 and the exterior end 142, a second flexural hinge link 152 connects the exterior end 142 and the second end 144, a third flexural hinge link 153 connects the second end 144 and the interior end 141, and a fourth flexural hinge link 154 connects the interior end 141 and the first end 143.

In the cymbal unit 111 constituted by the interior end 141, exterior end 142, first end 143 and second end 144, and the flexural hinge links connecting these components to one another, when the distance between the first end 143 and the second end 144 is increased by operation of the first actuator 410, the distance between the interior end 141 and the exterior end 142 is reduced.

Here, since the interior end 141 is securely connected to the stationary section 310, reduction in distance between the interior end 141 and the exterior end 142 is achieved mainly by movement of the exterior end 142.

As the exterior end 142 moves, the operating section 320 linked to the exterior end 142 by the flexural hinge link is also moved. As a result, when the first actuator 410 operates, the operating section 320 performs translational motion in a moving direction of the exterior end 142 towards the interior end 141.

The rotational mechanism 200 carries out rotational motion of 1 degree of freedom independent of the translational mechanism 100. The rotational mechanism 200 includes a Scott-Russell linkage 210.

The Scott-Russell linkages 210 includes a first link 211, a second link 212 and a third link 213, and is disposed in the interior portion 310*b* of the stationary section 310. The Scott-Russell linkage 210 constitutes a Scott-Russell mechanism through operation of the respective components thereof.

The first link 211 is connected to the other end of a second actuator 420 connected at one end thereof to the stationary section 310. Here, as in the first actuator 410, a piezoelectric actuator may be applied to the second actuator 420.

The second link 212 is connected at one end thereof to the first link 211 via a flexural hinge and at the other end thereof to the exterior portion 310*a* of the stationary section 310 via a flexural hinge. Accordingly, when the first link 211 approaches the second link 212 by operation of the second actuator 420, the second link 212 is rotated in the clockwise direction about a connecting point between the second link 212 and the third link 213.

As the second link 212 is rotated in the clockwise direction, the exterior portion 310*a* of the stationary section 310 connected to the second link 212 by the flexural hinge is also rotated in the clockwise direction.

The third link 213 is connected at one end thereof to the second link 212 via a flexural hinge and at the other end thereof to the interior portion 310*b* of the stationary section 310 via a flexural hinge. Thus, when the second link 212 rotates in the clockwise direction, the third link 213 rotates in the counterclockwise direction about the connecting point between the second link 212 and the third link 213.

The rotational mechanism 200 may further include leaf springs 220. The leaf springs 220 are disposed outside the Scott-Russell linkage 210 on the stationary section 310 and guide rotation of the stationary section 310 by operation of the second actuator 420.

Specifically, plural leaf springs 220 are arranged at equal rotational intervals about the center of the stationary section 310 such that, during rotation of the exterior portion 310*a* of the stationary section 310, the interior portion 310*b* of the stationary section 310 is kept in a stationary state instead of rotating. As a result, the interior portion 310*b* of the stationary section 310 guides rotation of the exterior portion 310*a* of the stationary section 310 and the operating section 320.

Although this embodiment is illustrated as including four leaf springs 220 arranged at rotational intervals of 90 degrees about the center of the stationary section 310, the present invention is not limited thereto. For example, the rotational mechanism may include two leaf springs arranged at rotational intervals of 180 degrees or three leaf springs arranged at rotational intervals of 120 degrees, without being limited thereto.

As such, the translational mechanism 100 and the rotational mechanism 200 are disposed coplanar with each other on the stage base 300 to lower the center of motion, thereby improving responsiveness with respect to moment of inertia.

Next, operation of the planar 3-DOF stage according to the exemplary embodiment of the invention will be described with reference to the drawings.

First, the translational motion of the planar 3-DOF stage 1 will be described.

When voltage is applied to the first actuator 410 of the upper cymbal unit 111 in the pair of first cymbal units 120, the first actuator 410 is stretched in opposite directions and compresses the first and second ends 143, 144, which are coupled to the first actuator 410, so that the first end 143 is moved to the left and the second end 144 is moved to the right, thereby increasing the distance between the first end 143 and the second end 144.

As a result, the distance between the interior end 141 and the exterior end 142 connected to the first end 143 and the second end 144 via the flexural hinge links decreases. Here, since the interior end 141 is secured to the stationary section 310, reduction in distance between the interior end 141 and the exterior end 142 is achieved mainly by movement of the exterior end 142

As the exterior end 142 moves, the operating section 320 linked to the exterior end 142 by the flexural hinge link is also moved by the moving distance of the exterior end 142 towards the interior end 141. Since such movement of the operating section 320 is guided by the pair of second cymbal units 130 disposed horizontal to the moving direction of the operating section 320, translational motion of the operating section 320 may be stably carried out without rattling.

Next, the rotational motion of the planar 3-DOF stage 1 will be described.

When voltage is applied to the second actuator 420 of the rotational mechanism 200, the second actuator 420 is stretched in opposite directions. Here, since the second actuator 420 is secured at one end thereof to the stationary section 310, the second actuator 420 is stretched only in a direction towards the other end thereof. As the second actuator 420 is stretched, the first link 211 compresses the second link 212 while moving towards the second link 212.

As a result, the second link 212 is rotated in the clockwise direction about the connecting point between the second link 212 and the third link 213, and the exterior portion 310a of the stationary section 310 connected to the second link 212 via the flexural hinge is also rotated in the clockwise direction. Here, since the leaf springs 220 are arranged outside the Scott-Russell linkage 210 to guide rotation of the exterior portion 310a, the interior portion 310b of the stationary section 310 is kept in a stationary state while guiding rotation of the exterior portion 310a.

As such, since the interior portion 310b is kept in a stationary state by the Scott-Russell linkage 210 and the leaf springs 220 and the exterior portion 310a is rotated in the clockwise direction, the operating section 320 connected to the exterior portion 310a may also carry out rotational motion in the clockwise direction.

Although some embodiments have been described herein, it should be understood by those skilled in the art that these embodiments are given by way of illustration only, and that various modifications, variations, and alterations can be made without departing from the spirit and scope of the invention. Therefore, the scope of the invention should be limited only by the accompanying claims and equivalents thereof.

The invention claimed is:

1. A planar 3-DOF stage comprising:
   a translational mechanism carrying out translational motion of 2 degrees of freedom;
   a rotational mechanism carrying out rotational motion of 1 degree of freedom independent of the translational mechanism; and
   a stage base equipped with the translational mechanism and the rotational mechanism, and having a stationary section formed on an inner region thereof and an operating section formed on an outer region thereof,
   wherein the translational mechanism comprises a cymbal mechanism disposed between the stationary section and the operating section such that the cymbal mechanism is connected at one side thereof to the stationary section and at the other side thereof to the operating section, and the rotational mechanism comprises a Scott-Russell linkage disposed on the stationary section.

2. The planar 3-DOF stage of claim 1, wherein the translational mechanism comprises a plurality of cymbal mechanisms bisymmetrically installed on the stage base and each being disposed between the stationary section and the operating section such that the cymbal mechanism is connected at one side thereof to the stationary section and at the other side thereof to the operating section.

3. The planar 3-DOF stage of claim 2, wherein the cymbal mechanisms comprise a pair of first cymbal units disposed at upper and lower portions of the stage base, and a pair of second cymbal units disposed at right and left sides of the stage base.

4. The planar 3-DOF stage of claim 3, wherein the pair of first cymbal units and the pair of second cymbal units are disposed orthogonal to each other, and when one of the first cymbal units is displaced, the pair of second cymbal units guides translational motion of the operating section by the pair of first cymbal units.

5. The planar 3-DOF stage of claim 4, wherein the cymbal mechanism comprises an inner end connected to the stationary section; an exterior end disposed at an opposite side to the interior end and connected to the operating section; a first end disposed between the operating section and the stationary section; a second end disposed at an opposite side to the first end; a first flexural hinge link connecting the first end to the exterior end; a second flexural hinge link connecting the exterior end to the second end; a third flexural hinge link connecting the second end to the interior end; and a fourth flexural hinge link connecting the interior end to the first end, and wherein a first actuator is interposed between the first end and the second end to change a distance between the first end and the second end.

6. The planar 3-DOF stage of claim 1, wherein the Scott-Russell linkage comprises a first link connected to the other side of a second actuator connected at one side thereof to the stationary section; a second link connected at one side thereof to the first link and connected at the other side thereof to the stationary section such that the second link is rotated by movement of the first link to rotate the stationary section; and a third link connected at one side thereof to the second link and connected at the other side thereof to the stationary section.

7. The planar 3-DOF stage of claim 6, wherein the rotational mechanism further comprises a leaf spring disposed outside the Scott-Russell linkage to guide rotation of the stationary section.

8. The planar 3-DOF stage of claim 7, wherein the rotational mechanism comprises a plurality of leaf springs disposed outside the Scott-Russell linkage to guide rotation of the stationary section and arranged at equal rotational intervals.

9. The planar 3-DOF stage of claim 1, wherein the translational mechanism and the rotational mechanism are placed coplanar with each other on the stage base.

* * * * *